United States Patent [19]

Newell et al.

[11] 3,888,839

[45] June 10, 1975

[54] ISOLATED YEAST PROTEIN PRODUCT WITH INTACT RNA AND A PROCESS FOR MAKING SAME

[75] Inventors: Jon Albert Newell, Webster Groves; Robert Dudley Seeley, Crestwood; Ernest Aleck Robbins, High Ridge, all of Mo.

[73] Assignee: Anheuser-Busch, Incorporated, St. Louis, Mo.

[22] Filed: Nov. 29, 1972

[21] Appl. No.: 310,455

[52] U.S. Cl............ 260/112 R; 426/148; 426/204; 426/364
[51] Int. Cl. .............................................. A23j 1/18
[58] Field of Search ............ 426/60, 148, 364, 204, 426/212, 229; 260/112 R

[56] References Cited
UNITED STATES PATENTS

| | | |
|---|---|---|
| 3,268,412 | 8/1966 | Champagnat et al............... 195/3 |
| 3,585,179 | 6/1971 | Samejima et al................. 260/112 |
| 3,615,654 | 10/1971 | Ayukawa et al......................... 99/9 |
| 3,634,194 | 1/1972 | Frankenfeld et al................ 195/28 |
| 3,681,195 | 8/1972 | Suekane et al. ...................... 195/4 |
| 3,718,541 | 2/1973 | Kalina................................... 195/28 |
| 3,725,075 | 4/1973 | Muroi et al........................... 99/14 |

Primary Examiner—James R. Hoffman
Attorney, Agent, or Firm—Gravely, Lieder & Woodruff

[57] ABSTRACT

This disclosure relates to a yeast protein isolate having its nucleic acid substantially intact. The composition of the protein is 65–85% protein, 9–14% nucleic acid, 2–8% ash, 9–14% lipid, 0–1% fiber and 2–10% carbohydrate. The process comprises rupturing the yeast cells, separating the cell walls from a soluble fraction containing the protein and precipitating the protein from the soluble fraction to recover a substantially cell free protein.

9 Claims, 1 Drawing Figure

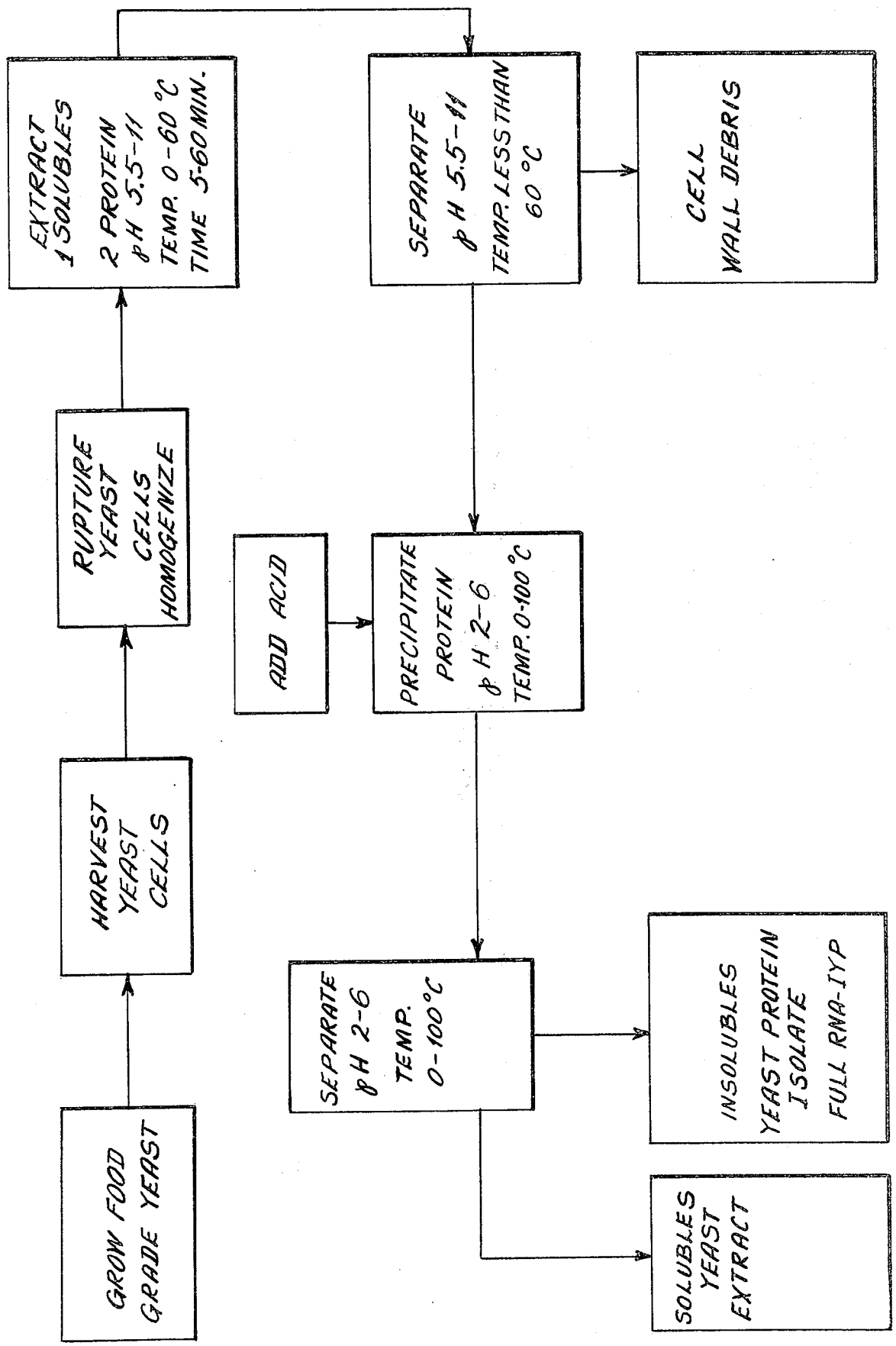

ISOLATED YEAST PROTEIN PRODUCT WITH INTACT RNA AND A PROCESS FOR MAKING SAME

BACKGROUND OF THE INVENTION

Yeasts, throughout history, have been used to leaven bread and to brew ale, beer and wines. In the 1930's, residual yeast from brewing operations and yeast produced as baker's yeast were dried and used for food purposes as a source of vitamins, minerals and protein. Dried food yeast contains approximately 33% to 40% true protein. In food usages, dried yeasts have been used at low level in bread, cereals, peanut butter mixtures and other food products and in vitamin supplements as a source of protein, vitamins, minerals and unknown nutrients. The levels of dried yeasts used in food products has never generally exceeded more than 5% because dried food yeasts have no functional values for food processing and at higher levels, contribute a distinct taste to the food product. Yeasts fractions have been used as a source of nutrients made from yeasts which have been autolyzed or cells broken up by mechanical or chemical means. In these cases, the protein has been recovered from the broken up yeast cells by alkaline extraction or solubilized by autolysis by the yeast enzymes themselves. These solubilized nutrients are then recovered by various methods. Alkaline extractions have been applied to autolyzed yeasts to improve the protein yield. The concentration of alkali that has been used to extract protein from non-disintegrated cells, mechanically ruptured cells, or autolyzed cells has been of sufficient amount to cause the pH to be 10.5 or higher. It is known that alkaline treatment of proteins decreases the nutritive value of the protein. Therefore, the extraction of protein in highly alkaline conditions should be avoided.

We have discovered a process for obtaining a protein isolate from yeast cells. This process makes use of a neutral or slightly alkaline extraction of disintegrated cells to avoid the deteterious effect on nutritional quality and flavor.

Furthermore, the protein is extracted and separated from the cell walls in excellent yield under commercially feasible process conditions. The protein can be recovered at a point of minimum solubility in good yield to produce a protein product having a bland taste, desirable functional and nutritional properties.

The isolated protein product contains about 15 grams of nucleic acid per 100 grams of crude protein. Considering that the Recommended Daily Allowance of the Food and Nutrition Board, National Research Council for protein in 65 grams per day for a 70 kilogram adult male, and the Protein Advisory Group of the United Nations System recommends that the amount of nucleic acid ingested per day from microbial proteins should be less than 2 grams, our protein isolate could constitute as much as 20% of a person's protein intake without exceeding the recommended intake of nucleic acid. Whereas the level of dried yeasts in foods was limited by nucleic acid content, flavor, digestability, and functionality, the only limitation on the use of the isolated protein is the nucleic acid content.

In this application the terms nucleic acid and ribonucleic acid (RNA) are used interchangeably.

SUMMARY OF THE INVENTION

Our process is comprised of the following steps: production of yeast cells, rupture of the cells, separation of the insoluble cell wall fragments from the soluble cytoplasmic fraction, treatment of the soluble fraction with alkali, recovery of the protein by precipitation and centrifugation, vacuum concentration, and drying. The substantially cell free isolated protein product contains about 40% of the solids, 60–65% of the protein, 60–65% of the nucleic acid, 64–68% of the lipid and less than 5% of the carbohydrate that was present in the yeast cell. The isolated protein product has the composition (dsb) of 65–85% crude protein, 9–14% nucleic acid, 2–8% ash, 9–14% lipid, and 2–10% carbohydrate, while including less than 1% crude fiber.

DETAILED DESCRIPTION

Yeast cells (biomass) is produced by methods known to those versed in the art. We prefer to use biomass of *Saccharomyces cerevisiae* and *Candida utilis* grown on food grade nutrients in batch and continuous fermentation in our process. The main considerations are that the yeast be of food grade and produced in good yield.

The biomass is harvested by centrifugation or filtration and water washed. When necessary, dilute alkali may be incorporated in the wash to remove adhering color and taste bodies. The yeast cells are ruptured by any of several known methods such as high pressure homogenization, attrition in a sand or colloid mill, sonic disintegration, repeated freeze-thaw cycles, lytic enzymes and the like. The main consideration is to rupture the majority of cells under such conditions that the majority of the protein remains in the soluble state, but can be harvested in a later step. We prefer to use homogenization. The ruptured cell system (homogenate) may be diluted, warmed and pH adjusted to favor processability.

The homogenate is separated by centrifugation and/or filtration into a cell wall residue and an extract, usually referred to as the alkali extract. The development of a yeast glycan from the cell wall residue is described in a copending application (Yeast Glycan and Process of Making Same Ser. No. 310,452, filed Nov. 29, 1972).

The protein present in the alkali extract is rendered insoluble by acidifying to the point of minimum solubility of the protein. The insoluble protein can be recovered readily by centrifugation or filtration. The recovered protein product is referred to as isolated yeast protein (IYP).

The separation of the IYP results in a protein sludge and the soluble cytoplasmic constituents. The soluble cytoplasmic constituents contain any nucleic acid fragments, protein fragments, glycogen, and all of the metabolic intermediates. It can be recognized that the soluble cytoplasmic constituents constitute a valuable fraction of the total microbial system. The harvested IYP preferably is water washed to remove adhering cytoplasmic material. The washed protein product preferably is dried with or without prior in vacuo concentration to a powder by spray drying, drum drying, freeze drying and the like.

Cell rupture, extraction of solubles, and processability are affected by pH, temperature, time, solids concentration, and homogenizer efficiency. Our usual method of measuring the extent of cell rupture is to determine the amount of nitrogen that remains soluble, i.e., $$\% \text{ N extractability} = 100 \times \frac{\text{g N in supernate after centrifugation}}{\text{g N in homogenate before centrifugation}}$$

The yeast biomass after washing has a pH of 4.5–5.5. The biomass is usually chilled, then passed through a Manton-Gaulin homogenizer to a chilled receiver. The process is repeated for a total of three passes. At least three passes are needed to obtain maximum cell rupture. In practice, the biomass is homogenized at the ambient pH of the yeast, namely 4.5–6.5. Cell rupture can also be achieved at higher pH's up to at least pH 9.5, but the subsequent separation of the cell wall residue from the solubles becomes more difficult.

Conditions of homogenization include pressure 5000 to 15000 psig; temp. 0° to 50°C.; number of passes is 1 to 5.

The affects of pH, solids concentration, and homogenizer efficiency upon the N extractability of *Candida utilis* and *Saccharomyces cerevisiae* are shown in Tables IA and Table IB.

TABLE IA

Effect of Extraction pH, Solids Level, and Homogenizer Efficiency Upon Nitrogen Extractability of *Candida utilis*

Chilled suspensions of *Candida utilis* at pH 5.0–5.5, 7–10% solids were homogenized by means of Manton-Gaulin homogenizer. The chilled homogenate was recycled through the homogenizer at a pressure of 8000 psig repeatedly to give one, two, three or four pass homogenate. The homogenate was diluted with up to 2.0 parts of water, and adjusted in pH. The diluted homogenates were incubated for 30 min. at 50°C. and then centrifuged. The nitrogen contents of the diluted homogenate, and of the supernate were measured by the Kjedahl method. % N extractions were calculated.

| pH of Extraction | Solids Content | No. of Passes | % Nitrogen Extracted | Separation of Solubles & Cell Wall Debris |
|---|---|---|---|---|
| 7 | 2.5 | 3 | 76 | Good |
| 8 | 2.5 | 3 | 74 | Good |
| 9 | 2.5 | 3 | 84 | Good |
| 10 | 2.5 | 3 | 82 | Good |
| 11 | 2.5 | 3 | 80 | Good |
| 9.5 | 2.5 | 1 | 70 | Good |
| 9.5 | 2.5 | 2 | 83 | Good |
| 9.5 | 2.4 | 3 | 89 | Good |
| 9.5 | 2.5 | 4 | 91 | Good |
| 9 | 2.4 | 3 | 83 | Good |
| 10 | 2.4 | 3 | 82 | Medium |
| 11 | 2.4 | 3 | 78 | Medium |
| 12 | 2.4 | 3 | 85 | Medium |
| 9 | 6.9 | 3 | 64 | Medium |
| 10 | 6.9 | 3 | 59 | Poor |
| 11 | 6.9 | 3 | 54 | Poor |
| 12 | 6.9 | 3 | 41 | Poor |

TABLE IB

Effect of Extraction pH, Temperature, Time, Solids Content, and Homogenizer Efficiency Upon the Nitrogen Extractability of *Saccharomyces cerevisiae*

Chilled suspensions of commercial baker's yeast at ambient pH of 6–6.5, 7–10% solids, were homogenized at a pressure of 8000 psig by means of a Manton-Gaulin homogenizer. The chilled homogenate was recycled through the homogenizer to give one, two or three passes. The homogenates were diluted with up to two volumes of water and adjusted in pH. The diluted homogenates were incubated for 5–60 minutes at 25–60°C. and centrifuged. The nitrogen contents of the homogenates and supernates after centrifugation were measured by the Kjeldahl method. % N extractions were calculated.

| pH | % Solids Content | Time (min.) | °C. Temp. | No. of Passes | % Nitrogen Extractability |
|---|---|---|---|---|---|
| 9.5 | 9.1 | 30 | 25 | 3 | 83 |
| 9.5 | 4.8 | 30 | 25 | 3 | 84 |

TABLE IB-Continued

Effect of Extraction pH, Temperature, Time, Solids Content, and Homogenizer Efficiency Upon the Nitrogen Extractability of *Saccharomyces cerevisiae*

Chilled suspensions of commercial baker's yeast at ambient pH of 6–6.5, 7–10% solids, were homogenized at a pressure of 8000 psig by means of a Manton-Gaulin homogenizer. The chilled homogenate was recycled through the homogenizer to give one, two or three passes. The homogenates were diluted with up to two volumes of water and adjusted in pH. The diluted homogenates were incubated for 5–60 minutes at 25–60°C. and centrifuged. The nitrogen contents of the homogenates and supernates after centrifugation were measured by the Kjeldahl method. % N extractions were calculated.

| pH | % Solids Content | Time (min.) | °C. Temp. | No. of Passes | % Nitrogen Extractability |
|---|---|---|---|---|---|
| 9.5 | 3.1 | 30 | 25 | 3 | 92 |
| 9.5 | 3.1 | 30 | 25 | 2 | 80 |
| 9.5 | 3.1 | 30 | 25 | 1 | 63 |
| 9.5 | 3–4 | 5 | 50 | 3 | 91 |
| 9.5 | 3–4 | 20 | 50 | 3 | 93 |
| 9.5 | 3–4 | 30 | 50 | 3 | 96 |
| 9.5 | 3–4 | 60 | 50 | 3 | 96 |
| 9.5 | 3–4 | 5 | 60 | 3 | 93 |
| 9.5 | 3–4 | 20 | 60 | 3 | 94 |
| 9.5 | 3–4 | 30 | 60 | 3 | 91 |
| 9.5 | 3–4 | 60 | 60 | 3 | 90 |
| 4.0 | 3–4 | 30 | 25 | 3 | 33 |
| 5.0 | 3–4 | 30 | 25 | 3 | 36 |
| 6.0 | 3–4 | 30 | 25 | 3 | 79 |
| 7.0 | 3–4 | 30 | 25 | 3 | 93 |
| 8.5 | 3–4 | 30 | 25 | 3 | 93 |
| 9.5 | 3–4 | 30 | 25 | 3 | 96 |
| 6.0 | 3–4 | 60 | 60 | 3 | 42 |
| 6.5 | 3–4 | 60 | 60 | 3 | 33 |
| 7.5 | 3–4 | 60 | 60 | 3 | 30 |
| 8.5 | 3–4 | 60 | 60 | 3 | 73 |
| 9.5 | 3–4 | 60 | 60 | 3 | 90 |

The more dilute system and the three pass homogenization favors nitrogen extractability. The extraction can be carried out over the pH range of 5.5 to 11. Homogenized baker's yeast can be maximally extracted at pH 7, but homogenized *Candida utilis* requires a pH of 9 to 10. Extraction at about pH 10 or greater impairs the separation of the cell wall residue from the solubles.

Extraction time can be varied between about 5 and about 60 minutes at extraction temperatures of 0°C. to about 60°C., preferably 25°–60°C. The best process rate of the subsequent separation of the cell wall residue from the solubles were obtained when the extraction was done at 60°C. for 5 to 20 minutes, at pH 9.5. With *Candida utilis* and *Saccharomyces cerevisiae*, each pass through the homogenizer improved the nitrogen extractability, presumably by rupturing more cells; but, again, process rates and equipment must be considered. A three pass system is considered optimum in view of efficiency and economy.

The insolubles (cell wall debris) and the solubles are separated, preferably by centrifugation, at a temperature of less than about 60° and a pH of about 5.5 to about 11.

Taking N extractability and processing requirements into consideration, the optimal process to produce an extract of the soluble part of the yeast comprises the steps of: (1) growing a food grade yeast on a nutrient media, (2) harvesting and washing the yeast cell, (3) rupturing the yeast cells at a temperature of 0°–10°C., (4) handling the ruptured cells at pH 9.5, at 60°C. for 20 minutes, (5) removing the yeast insolubles at a temperature of about 60°C. The extract containing the soluble part of the yeast is called the alkali extract. Under the optimal conditions, 85–90% of the Kjeldahl N of the homogenate is obtained in the alkali extract. One wash of the cell wall residue increases the extraction yield to 90–95%.

If the alkali extract is adjusted to pH 4.5 at this stage, then the protein product recovered has the same ratio of nucleic acid to protein that exists in yeast, that is 13 to 15 grams of nucleic acid per 100 grams of crude protein. The recovered protein product constitutes IYP. The crude protein nitrogen recovered after the acidification to pH 4.5 of the alkali extract has routinely amounted to 75–80% of the crude protein nitrogen present in the alkali extract. The IYP from baker's yeast has averaged 81.5% crude protein and 11.7% RNA (dsb); that from *Candida utilis* has averaged 74.6% crude protein and 10.7% RNA (dsb).

The RNA is calculated by the following method:

RNA determination: About 50 mg. of a sample is digested with 5 ml. of 0.2 N KOH for 30 minutes at 100°C. The digest is acidified with 5 ml. $HClO_4$ citrate reagent (0.4 M citrate buffer, pH 2.2 containing 1.7 ml., 70% $HClO_4$ per 100 ml.). The residue is removed by centrifugation. The $A_{260}$ of the suitably diluted supernatant is measured. The extinction coefficient of 31.7 $A_{260}$ ml/mg. is used to calculate RNA. The RNA content is corrected for the $A_{260}$ contribution of protein fragments in the hydrolysate as measured by the Lowry method.

The crude protein is calculated by the Kjeldahl nitrogen method. The total nitrogen of the IYP is measured and multiplied by a factor of 6.25.

The protein isolate can be insolubilized from pH 2 to pH 6, preferably pH 3.5–5.5. The temperature is from 0°C. to 100°C. Portions of an alkali extract of *Candida utilis* were acidified with hydrochloric acid to pH 2–7. The percent precipitation was measured for each pH. The percent precipitation (% pptn) is defined as 100 X the grams of crude protein recovered as IYP divided by the grams of crude protein present in the alkali extract. When the alkali extract of *C. utilis* was acidified to pH 2, 3, 3.5, 4, 4.5, 5, 6, and 7, the % precipitation was 60, 68, 75, 77, 77, 65, 62 and 25% respectively.

The separation of the precipitated protein preferably is done at about the same conditions as the precipitation conditions.

The majority of the high molecular weight protein is recovered at the point of minimum solubility. In one case, 74% of the crude protein present in the alkali was recovered by acidifying to pH 4.5 with hydrochloric acid, while 80% was recovered by adjusting the alkali extract to 10% trichloracetic acid.

The pH and temperature of extraction, and the temperature of precipitation have an interrelating effect on the yield and solubility of the recovered protein isolate as shown in Table II. The data of Table II show that (1) at 25°C. process temperature, the extraction and precipitation yields are relatively independent of pH, but that the solubility of the recovered IYP becomes less as the extraction pH is increased; (2) at a 25°C. extraction temperature, and 60°C. precipitation temperature, the precipitation yield increased as the pH of the extraction was increased, but the solubility of the recovered IYP was relatively constant; and (3) at a process temperature of 60°C., pH 9.5 was needed for good extraction. Comparision of Examples No. 1 and No. 2 provide additional evidence that increased yield is obtained at the higher processing temperature. Furthermore, the higher process temperature results in greater throughputs and cleaner separations.

TABLE II

Effect of Extraction and Precipitation Temperature on the Yield and Solubility of Full RNA-IYP A chilled suspension of commercial baker's yeast at 10% solids was homogenized by three successive passes through a Manton-Gaulin homogenizer at 10,000 psig. The homogenate was diluted to 3.1% total Solids (TS), adjusted with NaOH to the noted pH values, incubated at 25°C. and 60°C. for 1 hour, and centrifuged. The extract from the 25°C. extraction was brought to 25°C. and 60°C. and adjusted to pH 4.5 with HCl. The extract from the 60°C. extraction was precipitated at 60°C. Crude protein was measured on the homogenates, extracts, and recovered protein. The recovered protein was resuspended to 5% solids, adjusted to pH 7, stirred for 30 minutes at 25°C., and centrifuged at 43,000 rcfg. The crude protein was measured on the protein suspension, and on the supernate after centrifugation.

| Extraction Temp. | 25°C., 1 hour | | | | | | | 60°C., 1 hour | | | |
|---|---|---|---|---|---|---|---|---|---|---|---|
| Precipitation Temp. | 25°C. | | | | 60°C. | | | 60°C. | | | |
| Extraction pH | % Extrn. | % Pptn | % Yield | IYP Solubility | % Pptn | % Yield | IYP Solubility | % Extrn | % Pptn | % Yield | IYP Solubility |
| 6.0 (amb) | 97.1* | 59.4 | 57.7 | 45.3 | 58.8 | 57.1 | 21.3 | 41.5 | 2.7 | 1.1 | — |
| 6.5 | 95.0 | 66.6 | 63.3 | 76.3 | 68.2 | 64.8 | 12.7 | 32.5 | 17.9 | 5.8 | — |
| 7.5 | 92.1 | 65.1 | 60.0 | 62.0 | 71.8 | 66.1 | 14.0 | 30.0 | 18.9 | 8.6 | — |
| 8.5 | 93.1 | 65.8 | 61.3 | 46.1 | 77.2 | 71.9 | 13.0 | 73.4* | 76.7 | 56.3 | 15.7 |
| 9.5 | 95.5 | 66.3 | 63.3 | 36.6 | 77.6 | 74.2 | 19.2 | 89.7 | 79.3 | 71.1 | 16.2 |

*Cell walls packed poorly on high speed centrifugation.

$$\% \text{ Extraction} = 100 \times \frac{\text{g crude protein in extract}}{\text{g crude protein in homogenate}} \text{ (No wash of cell walls)}$$

$$\% \text{ Precipitation} = 100 \times \frac{\text{g crude protein in extract} - \text{g crude protein in whey}}{\text{g crude protein in extract}}$$

$$\% \text{ Yield} = \% \text{ Extraction} \times \% \text{ Precipitation}/100$$

$$\% \text{ Solubility} = 100 \times \frac{\text{g crude protein in supernate after centrifuging at 43,000 rcfg}}{\text{g crude protein in sample before centrifuging}}$$

DESCRIPTION OF DRAWING

The drawing is a schematic flow sheet of the process of this invention.

Following are detailed examples of this invention.

EXAMPLE NO. 1

A chilled suspension of commercial baker's yeast at 9.0% solids was subjected to homogenization at a pressure of 10,000 psig whereafter it was cooled to 7°C. The homogenization procedure was repeated for a total of three passes. The homogenate was diluted to 3.4% solids and adjusted to pH 9.5 by the addition of sodium hydroxide. The diluted homogenate was warmed to 25°C., stirred for 15 minutes, and centrifuged at 14,000 rcfg to obtain the cell wall residue and the alkali extract. The alkali extract contained 78.5% of the solids and 95% of the nitrogen present in the homogenate.

The alkali extract containing 2.8% solids was acidified to pH 4.5 by the addition of hydrochloric acid at a temperature of 25°C., and centrifuged at 14,000 rcfg. The recovered protein isolate contained 54.4% of the solids and 65.0% of the crude protein present in the alkali extract. Thus, 42.6% of the yeast solids and 61.8% of the crude protein in the yeast was recovered as protein isolate.

The recovered protein isolate (IYP) contained (dsb) 82.5% crude protein and 13.1% RNA.

EXAMPLE NO. 2

A chilled suspension of baker's yeast at 9.0% solids was subjected to homogenization at a pressure 10,000 psig whereafter it was cooled to 45°F. The homogenization procedure was repeated for a total of three passes. The homogenate was diluted to 3.4% solids and adjusted to pH 9.5 by the addition of sodium hydroxide. The diluted homogenate was warmed to 60°C., stirred for 15 minutes and centrifuged at 14,000 rcfg. The alkali extract contained 79.1% of the solids and 92.2% of the crude protein present in the homogenate.

The alkali extract containing 2.8% solids was acidified to pH 4.5 by the addition of hydrochloric acid at a temperature of 60°C., and centrifuged at 14,000 rcfg. The recovered protein isolate contained 62% of the solids and 76.7% of the crude protein present in the alkali extract. Thus, 49% of the yeast solids and 70.6% of the crude protein in the yeast were recovered in the protein isolate.

The recovered protein isolate (IYP) contained (dsb) 84.2% crude protein and 11.9% RNA.

EXAMPLE NO. 3

Eighty gallons of a chilled suspension of baker's yeast containing 80 pounds of solids containing 42.8 pounds of crude protein and 6.0 pounds of nucleic acid was homogenized at a pressure of 8000 psig whereafter it was cooled to 45°F. The homogenization was repeated for a total of three passes. The homogenate was diluted to 220 gallons with city water and adjusted to pH 9.5 with sodium hydroxide. The diluted homogenate was agitated for 15 minutes, heated to 140°F. and centrifuged. The separation yielded 33 pounds of cell wall solids and 47 pounds of solids in the alkali extract.

Hydrochloric acid at a controlled concentration and feed rate was injected into the flow stream of the alkali extract so that the pH was 4.5 ± 0.1 at the point of mixing. The precipitated protein was preheated to 140°F. and centrifuged. N precipitability was 68.8%. The protein sludge was suspended with two volumes of water, heated to 140°F. and centrifuged. The washed protein sludge contained 29 pounds of solids at 82.5% crude protein (dsb). The recovered sludge contains 36% of the solids, and 55% of the crude protein present in the yeast. The washed protein was adjusted to pH 5.5–6.0 and spray dried. The composition of the spray dried isolated yeast protein (IYP) was (as-is): 5% moisture, 75.0% crude protein, 10.4% RNA, 4.8% ash, 10.8% lipid, less than 0.1% crude fibers and 5.1% carbohydrate.

EXAMPLE NO. 4

Candida utilis biomass was produced in continuous fermentation upon a molasses substrate supplemented with a source of nitrogen and phosphate. The biomass was harvested by centrifugation and washed three times with water.

Thirty five gallons of a chilled suspension of Candida utilis biomass containing 2.22 pounds of soilds containing 11.0 pounds of crude protein and 1.5 pounds of RNA were homogenized at a pressure of 8000 psig whereafter it was cooled to 45°F. The homogenization was repeated for a total of three passes. The homogenate was diluted to 60 gallons with water, adjusted to pH 9.5 with sodium hydroxide, agitated for 15 minutes, heated to 140°F. and centrifuged. The separation yielded eight pounds of cell wall solids and 14.2 pounds of soluble solids in the alkali extract.

The alkali extract was adjusted to pH 4.5 by the addition of phosphoric acid, heated to 140°F. and centrifuged. Seven pounds (dsb) of protein isolate and 6.6 pounds of soluble solids were recovered. The protein isolate was resuspended with two volumes of water, warmed to 140°F., and centrifuged. Six pounds (dsb) of washed protein isolate were obtained. The washed protein isolate was adjusted to pH 5.5–6.0 and spray dried.

The composition of the spray dried protein isolate (IYP) was: 6.9% moisture, 72.0% crude protein, 10.2% RNA, 6.7% lipid, 4.7% ash, less than 0.1% crude fiber, and 9.6% carbohydrate.

Although the previous Tables and Examples made use of Saccharomyces cerevisiae and Candida utilis, the product and process is not restricted to those strains. The process has been applied to Saccharomyces carlsbergensis, Saccharomyces fragilis (recently reclassified to Kluyveromyces fragilis), and two strains of Saccharomyces elipsoideus. The results are presented in Table III.

TABLE III

IYP Prepared from Various Yeast Strains

Yeast biomass was prepared in fermentation by processes known to those versed in the art. The biomass was harvested by centrifugation and washed twice with water. The yeast biomasses were then processed to IYP's in accordance with the process outlined in Example No. 1.

| Yeast Source | Growing Conditions | Crude Protein | RNA | Lipid | Ash |
|---|---|---|---|---|---|
| Saccharomyces cerevisiae | commercial production | 81.5 | 12.5 | 10.8 | 5.3 |
| Saccharomyces cerevisiae | continuous fermentation | — | 13.1 | — | — |
| Saccharomyces carlsbergensis | Recovered from fermented brewers wort | 81.0 | 13.7 | 12.2 | 2.6 |
| Saccharomyces carlsbergenisis | Batch fermentation on molasses | 83.1 | 13.4 | — | — |
| Saccharomyces elipsoideus (Montrechet) | Batch fermentation on molasses | 84.7 | 13.9 | — | — |
| Saccharomyces elipsoideus (Steinberg) | Batch fermentation on molasses | 84.2 | 13.4 | — | — |
| Saccharomyces fragilis | Batch fermentation on cheese whey | — | 10.2 | — | — |

The nutritional quality of the unfractionated yeast, of the isolated yeast protein, and of white bread with and without fortification with isolated yeast protein and non-fat milk solids has been measured. The results are presented in Table IV. The PER or Protein Equivalence Ratio were measured at WARF Institute, Inc., Madison, Wis. The feeding tests were done on rats and were made using a level of 10% corrected protein in the diet unless otherwise noted. Ther PER's were calculated to ANRC casein at a PER = 2.5. The actual test procedure is published in Official Methods of Analysis of the A.O.A.C., p. 800, 11th Edition (1970).

The PER data clearly shows that (a) the IYP prepared from *Candida utilis* is as nutritious as the parent yeast, (b) the IYP prepared from baker's yeast is more nutritious than the parent yeast, (c) the IYP from baker's yeast is nearly (96%) as nutritious as an equal amount of casein, (d) IYP incorporated into the white bread formula dramatically increases the nutritive properties of white bread, and (e) IYP as a protein added to bread is superior to non-fat milk solids.

Preferably the PER of yeast protein produced in accordance with this application is at least about 1.5.

TABLE IV

Nutrition Quality of Unfractionated Yeast, Isolated Yeast Protein, White Bread and White Bread Fortified Isolated yeast protein were produced in accordance with the process set forth in Example Nos. 3 and 4. Washed whole yeast and the homogenate of washed whole yeast were prepared as spray dried products. White bread was baked from the formula: 100 parts flour, 62 parts water, 8 parts sugar, 3 parts shortening, 1.8 parts salt, 0.5 parts yeast food and 2.5 parts compressed yeast. In another case, 5.6 parts of non-fat milk solids were added to the formula. In a third case, 3.1 parts of IYP were added. The NFMS and the IYP provided 2% protein on a flour basis. The bread samples were oven dried.

| Test No. | Material | Product Composition % dsb Corrected Protein(1) | RNA | Level of Corrected Protein in the Diet | PER |
|---|---|---|---|---|---|
| 1 | *Candida utilis*, whole cells | 41.6 | 7.6 | 10.0 | 1.47 |
| 2 | *Candida utilis*, homogenate | 33.4 | 5.4 | 10.0 | 1.63 |
| 3 | *Candida utilis*, homogenate | 42.0 | 6.7 | 10.0 | 1.70 |
| 4 | *Candida utilis*, homogenate | 40.5 | 6.0 | 10.0 | 1.62 |
| 5 | *Candida utilis*, IYP | 62.4 | 10.2 | 10.0 | 1.60 |
| 6 | *Candida utilis*, IYP | 65.4 | 11.5 | 10.0 | 1.55 |
| 7 | Baker's yeast, whole cells | 46.0 | 7.5 | 10.0 | 1.87 |
| 8 | Baker's yeast, whole cells | 48.0 | 7.3 | 10.0 | 1.80 |
| 9 | Baker's yeast, whole cells | 46.0 | 7.5 | 10.0 | 1.70 |
| 10 | Baker's yeast, IYP | 68.0 | 11.0 | 10.0 | 2.39 |
| 11 | White bread | 12.6 | — | 10.0 | 0.80 |
| 12 | White bread + NFMS | 13.7 | — | 10.6 | 1.19 |
| 13 | White bread + IYP of test 10 | 13.3 | 0.2 | 10.0 | 1.85 |
| 14 | Casein ANRC | — | — | 7.5 | 2.40 |
| 15 | Casein ANRC | — | — | 10.0 | 2.50 |
| 16 | Casein ANRC | — | — | 12.5 | 2.31 |
| 17 | Casein ANRC | — | — | 15.0 | 2.10 |

(1)% Corrected protein = 6.25 ( % Total N by Kjeldahl − $\frac{\% \text{RNA}}{6.13}$ )

Table V shows the essential amino acid composition of the isolated yeast protein products. The isolated protein products are especially rich in all of the essential amino acids except for the sulfur containing amino acids. Except for methionine and cystine, the contents of the essential amino acids meets or exceeds that cited for the FAO reference protein and for the growing rat.

The supplementation effect obtained on adding lysine sources to white flour is well recognized. Tests Nos. 12 and 13 of Table V show that fortification of white flour with NFMS and IYP provided equal amounts of lysine in the diet. The significantly greater nutritive effect of IYP addition versus NFMS addition (Test Nos. 12 and 13 of Table IV) could be due to the addition of more threonine with the IYP inasmuch as threonine is the second limiting amino acid in NFMS and in wheat protein. IYP is rich in threonine.

3. Set mixer on Speed 1.
4. Turn mixer on and add caramel colored water to the IYP in the Hobart mixing bowl very slowly, while mixing. Blend material well.
5. Extrude the blended material through a meat grinder. (e.g. Hobart attachment) and catch the extruded IYP in a dryer tray of pan. The extruded IYP can be cut into the desired length as it emerges from the extruder, or it can be collected as long strands and reduced to the desired size after drying.
6. Dry the extruded particles in a convection oven to a moisture content of about 10%. The dried, textured IYP is rehydrated for further use in food product applications by, (1) rehydrating in water (excess) at room temperature for 1 to 3 hours, or by, (2) rehydrating in excess warm water (100°–140°F.) for 1 hour. The textured IYP will

TABLE V

Essential Amino Acid Composition of Isolated Yeast Protein
Grams of Amino Acid per 100 grams of Corrected Protein[1]

| Amino Acid | Test No. from Table IV | | | | | | ANRC[2] Casein | FAO[3] | Amino Acid Pattern Required by Growing Rat |
|---|---|---|---|---|---|---|---|---|---|
| | 5 | 6 | 10 | 11 | 12 | 13 | | | |
| Lysine | 8.46 | 9.56 | 9.60 | 2.06 | 2.94 | 3.12 | 8.0 | 4.2 | 9.0 |
| Methionine | 1.35 | 1.32 | 2.03 | 1.76 | 1.96 | 1.91 | 2.84 | 2.2 | 1.6 |
| Cystine | 0.68 | 1.28 | 0.95 | 3.16 | 2.98 | 2.68 | 0.52 | 2.0 | 3.4 |
| Threonine | 5.25 | 5.42 | 5.34 | | | | 3.52 | 2.8 | 5.0 |
| Tryptophan | 1.37 | 1.35 | 1.42 | | | | 1.27 | 1.4 | 1.1 |
| Valine | 6.41 | 6.46 | 5.91 | | | | 9.12 | 4.2 | 5.5 |
| Phenylalanine | 5.33 | 5.26 | 5.20 | | | | 5.02 | 2.8 | 4.2 |
| Leucine | 9.29 | 9.48 | 10.00 | | | | 9.65 | 4.8 | 7.0 |
| Isoleucine | 5.75 | 6.06 | 5.40 | | | | 4.85 | 4.2 | 5.5 |
| Tryosine | 6.39 | 4.59 | 4.22 | | | | 5.55 | 2.8 | 3.0 |
| Histidine | 2.51 | 3.20 | 2.86 | | | | 3.20 | X | 2.5 |

[1]The amino acids were determined by WARF, Inc. by the amino acid analyzer, or by microbiological assay of methionine and cystine.
[2]Amino acid analysis of ANRC casein.
[3]FAO Committee on Protein Requirements (1957 b) "FAO Nutritional Studies" No. 16.
[4]P. B. Rama Rao, H. W. Norton, and B. Connor Johnson, J. Nutrition, 82, p. 88 (1964).

Laboratory tests have shown the Isolated Yeast Protein (IYP) described in this invention to have the following functional properties; bland flavor, light cream color, easy dispersibility, water absorption, fat absorption, fiber formation, thermal extrusion and gel coagulation at pH 3 and pH 6, on heating. Because of these properties, beneficial effects can be attained by the incorporation of IYP into food products, such as, meat products, bakery products, pasta products and sandwich spreads. (e.g. Tuna, Chicken Salad). Examples of these applications follow.

The textured IYP referred to in the meat product application is prepared as follows:

TEXTURED IYP

| Ingredients | % |
|---|---|
| IYP (Spray Dried) | 39.5 |
| Water | 59.3 |
| Caramel Coloring | 1.2 |
| | 100.0% |

Preparation:
1. Weigh required amount of IYP and place in a Hobart mixing bowl.
2. Measure required amount of water and add the caramel coloring.

absorb water in the ratio of 1½ parts water to 1 part IYP.

ISOLATED YEAST PROTEIN — FOOD PROTOTYPES

Isolated Yeast Protein (IYP) can be used as a meat extender in beef patties. In the following example, 30 parts of hydrated IYP were combined with 70 parts of ground beef. This ratio conforms to the requirements set forth by the U.S.D.A. in FNS Notice 219 and in accordance with regulations governing the National School Lunch Program (Type A School Lunch). The combined PER attained by this ratio is 2.6.

The water absorption and fat binding properties of the IYP aid in reducing shrinkage (fat and water loss) on cooking and enhances the moisture and texture of the cooked patty.

Beef Patties

| Ingredients | % | PER |
|---|---|---|
| Ground Chuck Beef | 70 | 2.8 |
| Hydrated, textured IYP (60% Moisture) | 30 | 2.2 |
| | 100 | 2.6 (combined) |

Preparation:
1. Blend the ground chuck and the hydrated textured IYP together and shape into a patty form.
2. Fry the patty for 4 minutes on each side, in a skillet or on a griddle, at 350°F. Season or flavor as desired.

The patty may also be cooked on a grill to the desired doneness.

In the following example, IYP is used as a meat extender in a meat topping, such as that used on pizza. In this example, 50 percent of the ground beef was replaced by hydrated, textured IYP. Replacement at levels greater than or less than 50 percent can be made to suit product requirements.

Meat Topping (Pizza)

| Ingredients | % |
|---|---|
| Cooked, Ground Chuck Beef | 50 |
| Hydrated, textured IYP, (60% moisture) | 50 |
| | 100 |

Preparation:
1. Blend hydrated, textured IYP with ground beef.
2. Cook in skillet or suitable pan until beef is browned.
3. Sprinkle cooked beef/hydrated IYP mixture onto pizza.
4. Bake pizza in oven at 450°F. until properly baked.

IYP can be used as an extender for ground beef in spaghetti sauce containing meat. In this example, 33⅓% of the ground beef was replaced by hydrated, textured IYP. Replacement at levels greater than or less than 33⅓ can be made to suit product requirements.

Spaghetti Sauce with Meat

| Ingredients | % |
|---|---|
| Part A | |
| Spaghetti Sauce Mix (Spices and Seasonings) | 5.7 |
| Wesson Oil | 3.3 |
| Tomato Paste | 23.3 |
| Water | 57.5 |
| Part B | |
| Ground Beef, Browned | 6.8 |
| Hydrated Textured IYP (60% Moisture) | 3.4 |
| | 100.0% |

Preparation:
1. Mix the ingredients in Part A together in a saucepan.
2. Heat to boiling stirring frequently.
3. Add the cooked meat and the rehydrated IYP.
4. Simmer 10 minutes, stirring occasionally.

Flavored texture IYP can be incorporated into salad and/or sandwich spreads, such as tuna salad and chicken salad. The IYP is used as an extender for tuna in this application.

Tuna Salad and/or Sandwich Spread

| Ingredients | % |
|---|---|
| Hard boiled egg, chopped | 25.80 |
| Tuna | 22.25 |
| Cold extruded, Tuna Flavored IYP, Rehydrated | 22.25 |
| Celery, Chopped | 19.40 |
| Mayonnaise | 10.30 |
| | 100.00% |

Preparation:
1. Combine the ingredients. Mix well.

Isolated Yeast Protein (IYP) can be incorporated into a cereal based product, such as, Sugar Cookies, Chocolate Chip Cookies, Spice Cookies and Chocolate Brownies, to produce a protein fortified, nutritious product. In addition to added nutrition, the water absorbing and fat binding properties of IYP impart improved texture and eating qualities to the baked product.

Sugar Cookies

| Ingredients | % |
|---|---|
| Flour, All Purpose | 22.5 |
| Isolated Yeast Protein (IYP) | 8.0 |
| Oleomargarine | 24.0 |
| Granulated Sugar | 19.6 |
| Brown Sugar | 13.1 |
| Whole Egg | 10.9 |
| Salt | 0.9 |
| Vanilla | 0.6 |
| Baking Soda | 0.4 |
| | 100.0% |

Preparation:
1. Cream the oleomargarine.
2. Add the granulated and brown sugar and beat until creamy.
3. Beat in the egg and the vanilla.
4. Sift all the dry ingredients together and stir into the above mixture.
5. Using a teaspoon, drop the batter onto a greased cookie sheet. Bake the cookies for 8 minutes at 375°F.

IYP can be added to pasta products, such as, noodles as a means of increasing the protein content and thereby improving the nutritional qualities of pasta products.

Noodles

| Ingredients | % |
|---|---|
| Flour | 53.4 |
| Water | 17.5 |
| Whole Egg | 16.2 |
| Olive Oil | 6.9 |
| IYP | 3.0 |
| Salt | 2.9 |
| Dry Egg Albumen | 0.1 |
| | 100.0 |

Preparation:
1. Place flour in a bowl. Make a well in the center. Add all the other ingredients.
2. Mix until the dough forms a ball.
3. Knead the dough until it is smooth and elastic.

4. Wrap in wax paper and allow to rest for 10 minutes.
5. Roll out very thin.
6. Cut in strips when sheet begins to dry but is not brittle.
7. Allow noodles to dry.

What is claimed is:

1. A protein concentrate isolated from yeast which protein concentrate contains on a dry solids basis from about 65% to about 85% protein, more than 9% to about 14% nucleic acid, about 2% to about 8% ash, about 9% to about 14% lipid, and about 2% to about 10% carbohydrate, said protein concentrate being insoluble in water and essentially free of cell wall residue and having a PER greater than about 1.5.

2. A protein concentrate according to claim 1 in which the yeast is selected from a strain of *Saccharomyces cerevisiae, Saccharomyces carlsbergensis, Saccharomyces fragilis, Saccharomyces elipsoidesus*, and *Candida utilis*.

3. A protein concentrate of claim 1 having a crude fiber content of less than about 1%.

4. A process for producing a substantially cell free yeast protein product comprising the steps of:
   a. Rupturing yeast cells,
   b. Extracting the protein from the ruptured yeast cells at a pH of about 5.5 to about 11 and a temperature of 0°C. to about 60°C. while maintaining the protein in soluble form,
   c. Separating the ruptured yeast cells into an insolubles fraction and a solubles fraction,
   d. Combining the solubles fraction and a food grade acid to a pH of about 3.5 to about 5.5 at a temperature of 0°–100°C. to insolubilize the protein, and
   e. Separating the insolubilized protein from the solubles fraction.

5. The process of claim 4 including the step of recovering a substantially cell free protein product containing on a dry solids basis about 65% to about 85% protein, about 9% to about 14% nucleic acid, about 2% to about 8% ash, from about 9% to about 14% lipid, about 2% to about 10% carbohydrate, and less than about 1% crude fiber.

6. The process of claim 4 wherein the ruptured cells are maintained at a pH between about 5.5 and about 11 and at a temperature between about 25°C. and 60°C. for about 5 to about 60 minutes to extract the protein from the cells.

7. The process of claim 4 wherein the ruptured cell walls are separated into an insolubles fraction and a solubles fraction at a temperature of less than about 60°C. and a pH of about 5.5 to about 11.

8. The process of claim 4 wherein the insolubilized protein is separated at a temperature of about 0° to about 100°C. and a pH of about 3.5 to about 5.5.

9. The process of claim 4 wherein the cell walls are ruptured by homogenization at a pressure of about 5000 to about 15000 psig and a temperature of about 0°C. to about 50°C. in 1 to 5 passes through the homogenizer.

* * * * *